United States Patent [19]

Ahmed et al.

[11] Patent Number: 4,961,950

[45] Date of Patent: * Oct. 9, 1990

[54] BUTTER-LIKE COMPOSITION

[75] Inventors: Salah H. Ahmed, Elk Grove Village; Anthony J. Luksas, Downers Grove, both of Ill.

[73] Assignee: Dairy Research, Inc., Rosemont, Ill.

[*] Notice: The portion of the term of this patent subsequent to Sep. 6, 2005 has been disclaimed.

[21] Appl. No.: 400,399

[22] Filed: Aug. 30, 1989

[51] Int. Cl.$^5$ ........................ A23C 15/16; A23D 7/00
[52] U.S. Cl. .................................... 426/581; 426/582; 426/583; 426/607
[58] Field of Search ................ 426/581, 583, 582, 607

[56] References Cited

U.S. PATENT DOCUMENTS 4,315,955  2/1982  Cramer ................................. 426/586
4,769,255  9/1988  Ahmed et al. ....................... 426/581

Primary Examiner—Marianne Cintins
Assistant Examiner—Helen Pratt
Attorney, Agent, or Firm—Griffin, Branigan & Butler

[57] ABSTRACT

A butter-like composition is produced which has a taste, texture and mouth feel which at least approximates that of butter and comprising a concentrated mixture of (a) at least one water-in-oil emulsion of a liquid dairy product, (b) at least one oil-in-water emulsion of a liquid dairy product, and (c) at least one water-in-oil emulsion of a vegetable fat. The ratio of (a) to (b) is at least about 6:4 but less than 9:1, the ratio of (a) and (b) to (c) is at least 1:3, and the total fat content of the composition is at least about 30%.

8 Claims, No Drawings

BUTTER-LIKE COMPOSITION

This application relates to the subject matter of applicants' prior U.S. Pat. No. 4,769,255, issued on Sept. 6, 1988, and entitled Spreadable Butter-Like Composition and Method of Production Thereof.

BACKGROUND OF THE INVENTION

In the above-noted prior patent, the entire disclosure of which is incorporated herein by reference and relied upon, a composition is disclosed which has a taste, texture and mouth feel similar to butter but which is spreadable at refrigeration temperatures, e.g. 34° to 45° F., and will not oil-out at room temperatures and above, e.g. 85° F. or even 95° F. The composition comprises a concentrated mixture of at least one water-in-oil emulsion and at least one oil-in-water emulsion of dairy products, where the ratio of water-in-oil emulsion to oil-in-water emulsion is at least 6:4 but is less than about 9:1 and wherein the fat content of the butter-like composition is at least about 40%.

The composition is made by preparing a feed of at least one liquid dairy product which is primarily an oil-in-water emulsion and has a fat content of at least about 8%. The feed is concentrated by removing, primarily, water, lactose and ash until a concentrate having at least about 40% fat is obtained. That concentrate is homogenized and the concentrate is caused to have a phase reversal, either prior to, during or after homogenization, so that the emulsion of the concentrate is converted from a primarily oil-in-water emulsion to a predominantly water-in-oil emulsion, whereby the concentrate forms the butter-like composition, and wherein the ratio of water-in-oil emulsion to oil-in-water emulsion in the composition is at least about 6:4 but is less than about 9:1.

The invention of that prior patent is based on three primary discoveries and several subsidiary discoveries. A first basic discovery in this regard is that all of taste, texture and mouth feel must result from a composition which is predominantly a water-in-oil emulsion.

A second basic discovery of that invention is IO that the taste, texture and mouth feel of butter results, in part, from butter actually being a combination of a water-in-oil emulsion and an oil-in-water emulsion. While the ability to accurately pinpoint the ratios of the water-in-oil emulsion to oil-in-water emulsion in butter has not been developed, it appears that the ratio in butter is somewhere about 9:1 or above. Unfortunately, however, when that ratio of water-in-oil emulsion to oil-in-water emulsion is about 9:1, or above, the fat phase will crystalize at refrigeration temperature and, thus, will render the composition essentially non-spreadable.

Therefore, as a subsidiary discovery in that invention, it was found that compositions which contain both a water-in-oil emulsion and an oil-in-water emulsion, must have a ratio thereof at or below about 9:1, or otherwise the non-spreadability of butter will also appear in that composition.

On the other hand, as a further subsidiary discovery of that invention, it was found that if that ratio is not at least about 6:4, and preferably about at least 7:3, then the taste, texture and mouth feel does not approximate that of butter. For example, it was found that the composition of U.S. Pat. No. 4,511,591, is actually a mixture of water-in-oil emulsion and oil-in-water emulsion, although the oil-in-water emulsion considerably predominates in that composition. Indeed, it appears that the ratio of water-in-oil emulsion to oil-in-water emulsion in a product of that composition is about 1:5 which, as it turns out, is about the same ratio as cream cheese, thus explaining why that composition has a taste, texture and mouth feel more similar to cream cheese than to butter.

As a further basic discovery, it was found that in order to achieve the taste, texture and mouth feel of butter, the composition must have a fat content of at least about 40% (the remainder being primarily water, milk serum and protein). Otherwise, the composition will have a predominantly watery taste, texture and mouth feel, as opposed to a predominantly fat taste, texture and mouth feel of butter.

As another subsidiary discovery in this regard, it was also found that the composition must be prepared so that essentially all of the fat which ultimately resides in the composition is in the emulsions from which the composition is formed and that fat cannot be added after those emulsions are formed, which is opposite the process in above-mentioned U.S. Pat. No. 4,511,591.

Finally, as a subsidiary discovery in that invention, it was found that in order to achieve these high fat levels, the dairy product from which the composition is made must be considerably concentrated prior to forming the composition; otherwise its high fat levels cannot be obtained, and the resulting composition will not have the taste, texture and mouth feel of butter.

In the process described in the above-noted prior patent, one or more feeds are used to produce a mixture which has a fat content of at least about 8%. The feeds can be any dairy products, so long as those dairy products are in liquid form and so long as those dairy products are primarily oil-in-water emulsions. However, most dairy products, indeed, meet these requirements and, therefore, any of the conventional dairy products may be used, for example, skim milk, low-fat milk, whole milk, non-fat milk solids, and cream and concentrated forms thereof, e.g. evaporated skim milk, whole milk, and cream. Other dairy products, such as buttermilk, could be used, and the particular form of the dairy product is not critical, other than the two reservations noted above. If, for example, skim milk is used as a feed, then a second feed must be used, since skim milk will not provide the necessary fat content of at least about 8%. Accordingly, in this situation, there would be at least two feeds, e.g. one of skim milk and one of cream so that the fat content of the mixture reaches at least about 8%. On the other hand, the amount of fat in the mixture cannot be overly high, since it will interfere with the concentration step. Thus, preferably, the fat content is not above about 30%, although higher fat contents than this may be used, e.g. up to about 35% fat or even a bit higher, if care is taken in the concentration step. Nevertheless, for practical and usual purposes, the fat content of the mixture will not be greater than about 30%.

After the mixture is formed, that mixture must be concentrated so that the concentrate has a fat content of at least about 40%, but more preferably about 50%. The concentrate may have a fat content up to about 60%, or even greater, but at fat contents significantly above 60%, the concentration step becomes more difficult.

The preferred concentration step utilizes ultrafiltration. Any conventional ultrafiltration unit may be used in this regard, and it is only necessary that the ultrafiltration unit retain substantially all of the protein in the concentrate (the protein, in part, functions as the natural emulsifiers), with the permeate containing, primarily, water, lactose and ash. This is achieved by the usual dairy ultrafiltration unit, and, thus, any conventional dairy ultrafiltration unit may be used in the concentrating step. Likewise, conventional temperatures for operating the ultrafiltration unit are quite acceptable, e.g. 100° to 130° F., although temperatures outside of this range may be used, if desired, e.g. 40° to 150° F.

After the concentration step, the resulting concentrate is homogenized. Any of the conventional dairy homogenizers may be used in this regard, and those homogenizers may be operated at conventional temperatures, e.g. 120° to 160° F., although temperatures outside of this range may be used if desired, e.g. 110° to 180° F. However, either prior to, during or after homogenization, the concentrate must experience a phase reversal, i.e. reversing the emulsion from, primarily, an oil-in-water emulsion to, predominantly, a water-in-oil emulsion. This phase reversal can be achieved by any relatively high shear mixing operation. However, since homogenization is a high shear mixing operation, it is more convenient and efficient to achieve at least a portion of the phase reversal during the homogenization step and in the homogenizer. Thus, it is only necessary to operate the conventional dairy homogenizer for a time and at a shear rate which will not only homogenize the product but achieve a portion of the phase reversal at the same time. With the phase reversal, the concentrate forms a butter-like composition which is, essentially, the product of the invention of the prior patent.

With butterfat concentrations of about at least 40%, the phase reversal is relatively easy to achieve in the usual dairy processing apparatus. As the feed is being further and further concentrated during ultrafiltration (the preferred concentration device), and the butterfat content is increased, some phase reversal will commence during ultrafiltration. When the butterfat content, during continued ultrafiltration, significantly exceeds 40%, substantial amounts of phase reversal will take place during ultrafiltration. Thus, it is possible to achieve the phase reversal, especially in regard to the lower emulsion ratios, entirely during ultrafiltration.

However, additional shear is often required to achieve the desired degree of phase reversal, especially in regard to the higher emulsion ratios, and this additional shear is provided by the homogenization step, where further phase reversal takes place. In addition, even if all of the desired phase reversal takes place during ultrafiltration, the composition should nevertheless be homogenized, or otherwise the product will not be of the quality and uniformity normally desired.

Accordingly, while the ultrafiltration step is referred to as a concentration step, in fact, significant or even substantially all of the required phase reversal may take place in that step. Likewise, while the homogenization step is characterized and a means of achieving phase reversal, little or most or even all of the phase reversal may take place during homogenization. Thus, it is the combination of ultrafiltration and homogenization which achieves the required phase reversal and the completion of the product.

To complete the composition, only conventional ingredients need be added. These conventional ingredients can include flavorings, such as salt, colorings, e.g. FDA yellows, and the like.

The composition is then packaged in any convenient package by any conventional packaging apparatus. While pasteurization may be performed during packaging, if a pasteurizing step is desired, it is preferred that the pasteurizing step take place prior to homogenization. Thus, the pasteurizing step, if desired, may take place at any point in the process, preferably prior to homogenization, and more preferably in the feed step, although pasteurization anytime prior to packaging may be used.

The composition can be molded, for example, into one pound blocks, quarter pound sticks, or packaged in tubs in the conventional manner.

The characteristics of the composition will somewhat depend on the ratio of the water-in-oil emulsion to the oil-in-water emulsion. With lower ratios, the spreadability will increase but the taste, texture and mouth feel will not be as close to that of butter as would be higher ratios. On the other hand, as the ratio is increased, the taste, texture and mouth feel will be more similar to butter, but the spreadability thereof will decrease. The optimum combination of these properties is where the ratio is about 7:3 to 8:2, and this will produce a taste, texture and mouth feel very similar to butter, while providing good spreadability.

As can, therefore, be appreciated from the description of the invention in the prior patent, a substantial improvement in the art of butter spreads is provided by the composition and method of that prior patent. However, the composition of that prior patent does require that the fat content of that composition be only butter fat. As specifically brought in the prior patent, all of the fat, which is to ultimately reside in the spreadable composition, must be in the feed to the process, and since the feed to the process is a liquid dairy product, which, of course, will only contain butter fat, the resulting composition will contain only butter fat. For certain dietary conditions, it is advisable to control the butter-fat intake, and for that reason, the spreadable composition of the prior patent has some restricted utilities.

In addition, the spreadable composition of the prior patent is so arranged that it will not oil-out at elevated temperatures, and, thus, it is not substantially effective for use in most cooked foods. For example, the spreadable composition of the prior patent is not recommended for use in baking or in frying, since the higher temperature melting characteristics of that composition are unfavorable for such uses.

It would, therefore, be an advantage to provide a modified composition of the prior patent with modifications which not only reduce the amount of butter fat in the composition, but which also provide an ability for using the modified composition in cooking, especially in frying.

BRIEF DESCRIPTION OF THE INVENTION

The present invention is based on the discovery that the composition of the prior patent, as well as the process for making thereof, can be modified so as to incorporate in that composition vegetable fats and oils. This correspondingly reduces the butter-fat content of the modified composition, for the dietary reasons noted above, and, in addition, imparts properties to the modified composition which will allow its use in some cooking uses, especially in frying uses.

It has now been discovered that a substantial amount of vegetable oil may be incorporated into the composition of the prior patent, to provide a modification thereof, and at the same time, that incorporation of the vegetable fat will not substantially deteriorate the spreading properties of the composition of the prior patent. Thus, it has been found that vegetable oil, or compositions thereof, especially prepared margarine, can be combined with the spreadable composition of the prior patent. The oil or margarine (referred to hereinafter as simply "oil") may be added to the spreadable composition of the prior patent either prior to preparation of the spreadable composition of the prior patent or subsequent thereto. It has also been found that when the oil is used in that composition, the total amount of fat (both butter fat and oil) contained in the modified composition can vary more widely than the amount of fat (only butter fat) that can be contained in the composition of the prior patent.

Most surprisingly, however, even when substantial amounts of oil are used to replace, or in addition to, the butter fat in the composition of the prior patent, the resulting modified composition does not have the taste of margarine, as would be assumed, but most surprisingly retains, essentially, the taste, texture and mouth feel of the composition of the prior patent, which taste, texture and mouth feel is similar to that of butter. This is a very important feature of the present invention. Indeed, the ratio of the composition of the prior patent to the added oil can be as low as 1:3, and the resulting composition will still have a taste, texture and mouth feel which will at least approximate that of butter. Further, especially with a ratio about such as that noted above, the total fat content of the modified composition can be as low as about 30%, and still have a taste, texture and mouth feel which at least approximates that of butter.

Thus, the present invention provides a butter-like composition which has a taste, texture and mouth feel which at least approximates that of butter, comprising a concentrated mixture of (a) at least one water-in-oil emulsion of a liquid dairy product, (b) at least one oil-in-water emulsion of a liquid dairy product, and (c) at least one water-in-oil emulsion of a vegetable fat, wherein the ratio of (a) to (b) is at least about 6:4 but less than 9:1, the ratio of (a) and (b) to (c) is at least 3:1, and the total fat content of the composition is at least about 30%.

DETAILED DESCRIPTION OF THE INVENTION

With the present modified composition, all of the ingredients, processing, processing conditions, additives, and compositions disclosed in the prior patent are equally applicable to the present invention, with the exceptions noted below. Therefore, for sake of conciseness, those will not be repeated in this application, and the entire disclosure of the prior patent is incorporated herein by reference for the details thereof.

However, as opposed to the composition of the prior patent, the present composition contains vegetable oil, either in the form of oil, per se, or in the form of an oil composition, especially margarine. If the vegetable oil is added to the composition during the processing thereof, in the manner described in the prior patent, then it is preferred that vegetable oil, per se, be used, since the vegetable oil is much more easily accommodated in that process, as opposed to vegetable oil compositions, such as margarine. On the other hand, if the vegetable oil is added to the composition of the prior patent after that composition has been made, according to the process of the prior patent, then it is preferred that the vegetable oil be added as a vegetable oil composition, especially margarine, since margarine is much easier to add to the composition of the prior patent, after preparation thereof, than is vegetable oil, per se. This is because margarine already has associated therewith sufficient emulsifiers to emulsify the margarine in the composition of the prior patent by simple mixing. If vegetable oil, per se, is used instead of margarine, then it is much more difficult to emulsify the oil in the already prepared composition of the prior patent, and depending upon the specific ratios of the already prepared composition and the amount of oil added thereto, additional emulsifiers may be required.

Considering first the present modification where vegetable oil is added during the processing of the composition of the prior patent, the oil may be added thereto at any step of the process prior to homogenization. Thus, the oil may be added as one of the feeds to the process, but if so, then the oil must be appropriately emulsified. Depending upon the amount of oil being added, the emulsion may be either a water-in-oil emulsion or an oil-in-water emulsion, and either will adequately function in the process, since during subsequent steps of the process, phase reversal takes place and either of these emulsions will adequately function in the process. However, in the final composition of the present invention, the vegetable oil must be predominantly in a water-in-oil emulsion. If the vegetable oil in the final composition is predominantly an oil-in-water emulsion, the final composition will exhibit too much of an unacceptable watery taste. Thus, in the present modified composition, the oil contained in the composition should be at least predominantly a water-in-oil emulsion, e.g. at least 50% of the oil emulsion is a water-in-oil emulsion, more preferably at least 60%, and even more preferably at least 80%.

Thus, in order to prepare the present modified composition with the oil added to the process, it is only necessary to add the oil as an emulsion in a feed to the process and then conduct the process in the manner described in the prior patent. However, since this requires additional processing and, possibly, additional emulsifiers, as discussed above, this is not the preferred form of the invention. The preferred form of the invention is where the oil, in the form of a prepared margarine, is mixed with the spreadable composition of the prior patent. This preferred form of the invention has several advantages. Firstly, the margarine is already in the form of the appropriate predominant water-in-oil emulsion. Also, the margarine already has therein the required emulsifiers to ensure that complete emulsification and mixing will occur between the margarine and the spreadable composition. Thirdly, no care need be exercised to make sure that the phase reversal, required in preparing the spreadable composition, is not disrupted by the presence of the oil emulsion. For all these reasons, it is greatly preferred that the oil be added to the spreadable composition in the form of margarine, once the spreadable composition has been prepared.

In this latter regard, to achieve that mixing, only conventional mixers operated at ambient temperatures are required, although the particular mixing apparatus, time and conditions are not critical, and if desired, lower temperatures, e.g. as low as freezing temperatures, and higher temperatures, e.g. up to the melting point of the margarine, may be easily accommodated. It is only necessary that the mixing be continued to the point where a uniform mixture of the emulsions are obtained.

Thereafter, the modified product may be packaged in the same manner described in the prior patent, and, as described in the prior patent, various additives may be used therewith, e.g. flavorings, salt, spices, colorings, preservatives (though not required), and the like.

For the sake of conciseness, the invention will be hereinafter described in connection with the preferred embodiment, i.e. the adding of the oil in the form of prepared margarine, but it is to be understood that the following description of the preferred embodiment is also applicable to the non-preferred embodiment of adding of the oil during processing of the spreadable composition.

As briefly noted above, one of the surprising discoveries of the invention is that, as opposed to the spreadable composition of the prior patent, the inclusion of margarine in the spreadable composition will allow wider ranges of fat content. Thus, the combination of the spreadable composition and margarine will allow fat contents as low as 30% (total fat — butter fat and vegetable oil) and still provide a composition which approximates the taste, texture and mouth feel of butter. This composition does not have the butter-flavor intensity of the spreadable composition of the prior patent, but the butter-flavor intensity of the modified composition of the present invention is still much greater than that of margarine. Even more surprisingly, when the present modified composition was compared with conventional somewhat similar commercial compositions, i.e. commercial compositions being a mixture of butter and margarine, the present compositions had significantly more butter flavor than those commercial compositions, when compared on essentially equal butter-fat contents. The reason for this is not understood completely, but it is believed that this higher butter-flavor intensity in the present composition, as opposed to the butter/margarine mixtures commercially produced, is a result of the unique ratios of oil-in-water emulsion to water-in-oil emulsion of the spreadable composition of the prior patent. Apparently, those ratios provide butter-flavor intensities much greater than butter alone, on an equal fat basis, and thus, the present composition with the spreadable composition of the prior patent and margarine provides much higher butter-flavor intensity than the commercial compositions of mixtures of butter and margarine.

In this latter regard, for better flavor, mouth feel and texture of the present composition, the preferred ratios of the water-in-oil emulsion of the liquid dairy product to the oil-in-water emulsion of the liquid dairy product, as described in the prior patent, are also preferred in the present composition, i.e. where that ratio is at least about 7:3 and more preferably where that ratio is about 7:3 to 8:2. Also, while, as noted above, the fat content of the present modified composition can be as low as at least about 30%, higher fat contents are preferred, i.e. at least about 35% and the lower fat content of the composition of the prior patent, i.e. about 40%, is most preferred. The total fat content of the present modified composition is preferably up to about 70% or 80%.

As note above, the ratio of the combination of the water-in-oil emulsion of the liquid dairy product and the oil-in-water emulsion of the liquid dairy product to the predominantly water-in-oil emulsion of the vegetable fat can be as low as at least about 1:3, but it is preferred that this ratio be no higher than about 5:1, since at that ratio, the ability of the present modified composition to be effective in cooking, especially frying, begins to significantly decrease. Preferably, that ratio is between 2:3 and 4:1.

The present modified composition is quite capable of effectively participating in cooking, as opposed to the composition of the prior patent. Thus, the present modified composition is useful, for example, in frying eggs and imparts a high butter-flavor intensity to the eggs, even when small amounts of the present modified composition are used in frying the eggs. This is as opposed to the composition of the prior patent.

The invention will be illustrated by the following example, but it is to be understood that the invention extends to the scope of the foregoing disclosure and the following claims. In the example, as well as in the specification and claims, all ratios and percentages are by weight.

EXAMPLE

A spreadable composition was prepared in accordance with Example 1 of the prior patent. That composition was mechanically mixed, on an equal weight basis, with a commercially available tub margarine made of corn oil. The spreadable composition of the prior patent and the margarine easily mixed together and were easily homogenized into a homogeneous mixture using a conventional dairy homogenizer.

The texture of the resulting composition was similar to the spreadable composition of the prior patent; the taste of the composition was also similar to the taste of that composition, but did have a slightly noticeable margarine taste; the mouth feel of the composition was similar to the composition of the prior patent, but did have a slight margarine mouth feel associated therewith.

A small portion of the mechanical mixture of the composition was placed in a conventional iron skillet and heated to a temperature appropriate for frying eggs. Melting of the composition took place, and the eggs were fried therein in a conventional manner. The eggs had the same appearance of eggs fried in either oil, butter or margarine. The flavor of the eggs was clearly that of butter, as opposed to margarine and had a very pleasant taste, texture and mouth feel.

It has also been found that the process of the prior patent can be operated without using any fat containing liquid dairy products at all. Thus, it is possible to operate the process of the prior patent by substituting for the liquid dairy product containing butter fat, a oil emulsion of vegetable fat, e.g. using skim milk and an emulsion of vegetable fat. The product is a total vegetable-fat composition similar to butter or margarine, but such a composition, while having very unique and interesting properties, does not have the flavor of butter. Combinations of vegetable fat emulsions and butter-fat containing liquid dairy products may also be used. As the ratio of butter fat to vegetable fat increases in such processes, then, of course, a greater increase in the flavor of butter results.

As noted above, it was found that the amount of total fat in the composition could be considerably reduced from that of the prior patent, either by reducing the amount of butter fat or vegetable fat, or both; but in this case, not only is the flavor of butter reduced, but the mouth feel of the fat is likewise reduced. It is for this reason that the total fat content of the composition should be at least about 30%, as noted above, although a product with at least some acceptable properties can be produced with fat contents as low as 20%. Nevertheless, it is preferred that the total fat content be the same as that of the prior patent, i.e. at least about 40%.

As discussed in the prior patent, the concentration step of the process results in the high level of natural emulsifiers. It is these emulsifiers which provide the oil-in-water emulsions and water-in-oil emulsions of the fats involved. In the prior patent, it was explained that in order to obtain good products, the fats used in the finished composition must be present when the natural emulsifiers are concentrated, e.g. by an ultrafiltration step. However, with the presence of vegetable fats, as in the present modified composition, this is not entirely required, as noted above. Indeed, the process of the prior patent can be operated with feeds containing no fats, which will simply serve to isolate the natural emulsifiers of, for example, skim milk. Those emulsifiers can be recovered as a liquid and/or dried to a powder form, and these emulsifiers form very excellent emulsifiers for fat systems, particularly butter fat and vegetable fat systems. Thus, they can be used as vegetable fat emulsifiers when vegetable fat is used in the process of the prior patent, as described above. However, for purposes of the composition of the prior patent and for purposes of the composition of the present application, recovering such natural emulsifiers from, for example, skim milk, and using those emulsifiers to emulsify the fats does not produce what is considered to be an equivalent product.

The vegetable fats used in the present modified composition may be any vegetable fat, e.g. corn oil, soy bean oil, safflower oil, sunflower oil, etc., or mixtures thereof, or the hydrogenated or partially hydrogenated forms thereof. The particular vegetable is not critical to the present composition.

What is claimed is:

1. A butter-like composition which has a taste, texture and mouth feel which at least approximates that of butter, comprising a concentrated mixture of (a) at least one water-in-oil emulsion of a liquid dairy product, (b) at least one oil-in-water emulsion of a liquid dairy product, and (c) at least one water-in-oil emulsion of a vegetable fat, wherein the ratio of (a) to (b) is at least about 6:4 but less than 9:1, the ratio of (a) and (b) to (c) is at least 1:3, and the total fat content of the composition is at least about 30%.

2. The composition of claim 1 wherein the ratio of (a) to (b) is at least about 7:3.

3. The composition of claim 2 wherein the ratio of (a) to (b) is about 7:3 to 8:2.

4. The composition of claim 1 wherein the total fat content of the composition is at least about 35%.

5. The composition of claim 4 wherein the said fat content is at least about 40% and up to about 70%.

6. The composition of claim 1 wherein the ratio of (a) and (b) to (c) is up to 5:1.

7. The composition of claim 6 wherein the ratio of (a) and (b) to (c) is between 2:3 to 4:1.

8. The composition of claim 1 wherein the composition is a prepared composition of (a) and (b) which is in a mechanical mixture with (c).

* * * * *